UNITED STATES PATENT OFFICE.

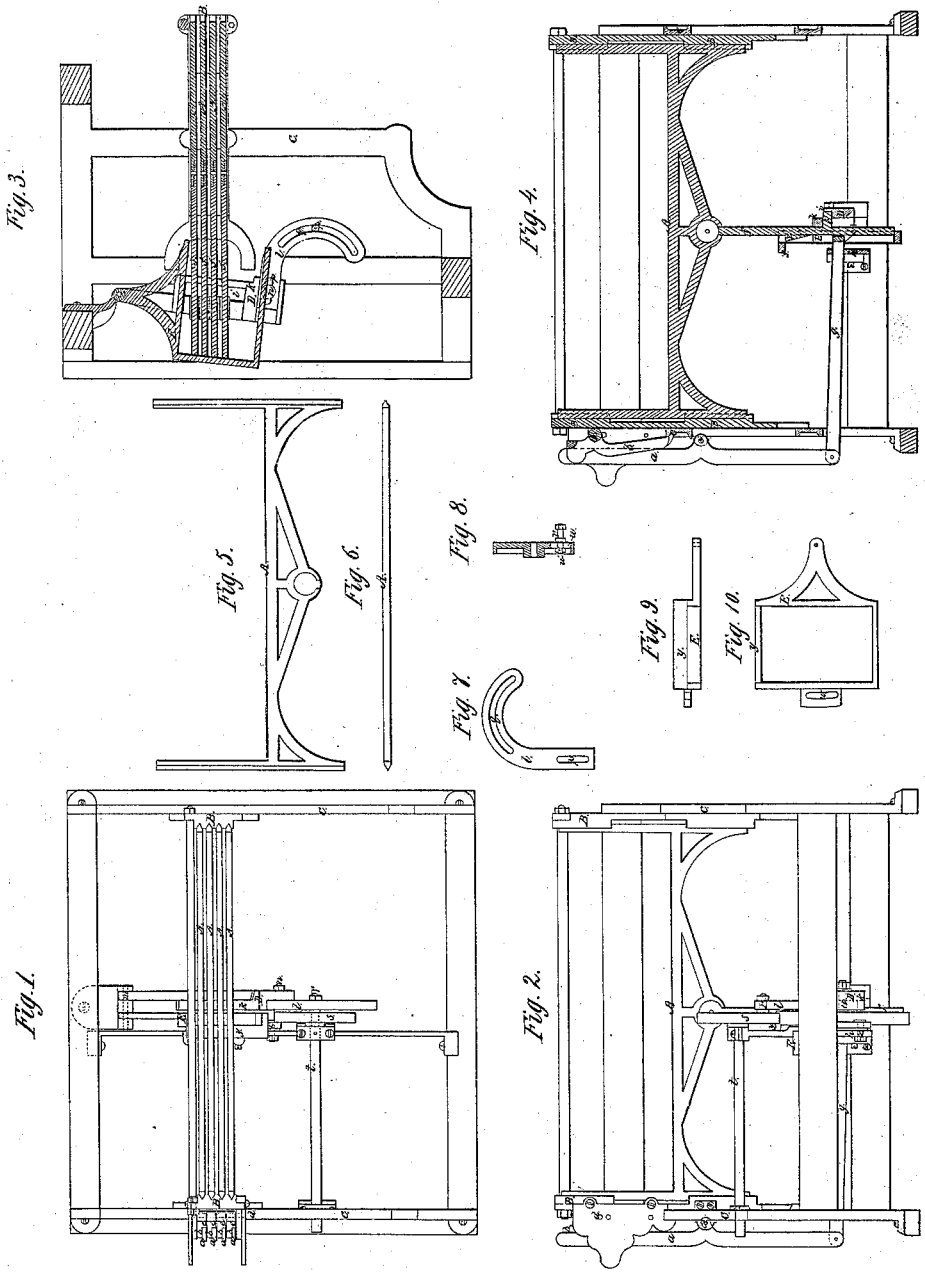

W. W. McGREGOR, OF DEDHAM, MASSACHUSETTS.

IMPROVEMENT IN HARNESS-MOTION OF LOOMS.

Specification forming part of Letters Patent No. 56,077, dated July 3, 1866.

*To all whom it may concern:*

Be it known that I, WILLIAM W. MC-GREGOR, of Dedham, in the county of Norfolk and State of Massachusetts, have made a new and useful invention having reference to what are termed "Fancy-Looms for Weaving Fabrics;" and I do hereby declare the same to be fully described in the following specification and represented in the accompanying drawings, of which—

Figure 1 is a top view of a loom-frame as provided with my invention. Fig. 2 is a side elevation of it; Fig. 3, a transverse section, and Fig. 4 a longitudinal section, of it.

The particular object or purpose of my invention is the operation of the harnesses of the looms, and this it accomplishes with great certainty and positiveness.

Each harness is supported in or by what I term a "harness-carrier," A, which is a frame formed as represented in side view in Fig. 5 and in top view in Fig. 6. It is also shown in Figs. 1, 3, and 4. Each of said frames has an arm, $f$, hinged to and projecting down from it, as shown in such figures.

A series of these carriers is arranged between two vertical guides, B B, projecting from the loom-frame C, and arranged therein in manner as represented. These guides are grooved on their inner surfaces to receive the harness-carriers and guide them during their vertical movements.

These carriers and guides have mechanism for actuating the carriers. The said carrier-operative mechanism is to be operated and controlled in its operation by a pattern-chain and its balls or rollers, such as are employed in the common and well-known "Crompton loom." This chain is to be applied to and so as to elevate the two series of levers of the said mechanism, such two series being exhibited at $a\ a\ a\ a\ b\ b\ b\ b$. There are two of the levers, $a\ b$, to each of the harness-carriers A, and they are arranged on one side of the loom, in manner as exhibited in Figs. 1, 2, and 4. The longer levers $a\ a\ a\ a$ turn on a fulcrum-pin, $c$, and the shorter levers, which are arranged so that one of them shall be on each side of each of the longer levers, are supported on a fulcrum-pin, $d$, which is placed between the next adjacent guide B and the upper arms of the longer levers. Each shorter lever has a stud or hook, $e$, extending from its upper arm and directly in rear of the upper arm of the fellow longer lever, the same being as shown in Figs. 1 and 4.

The vertical arm $f$ of each carrier A extends down through one of a series of connecting-rods, $g\ g\ g\ g$, which slide through and are supported by a stationary brace or bar, $h$. Each of the said rods $g$, at its outer end, is jointed to the longer arm of one of the levers $a\ a\ a\ a$.

There is a short stud, $h'$, extended from each vertical arm $f$ and toward the opening $i$ of a lifter, D, which is a lever composed of two parts, $k\ l$. The fulcrum $m$ of this lifter is at or near its rear end.

The curved portion $l$ of the lifter is connected with the part $k$ by means of a clamp-screw, $n$, and nut $o$. The screw $n$ goes through a slot, $p$, made in the part $l$, as shown in Fig. 7, which denotes the said part $l$ in side view.

There is a curved slot, $q$, made in the part $l$, and to receive a crank-pin, $r$, which projects from a crank-wheel, $s$, fixed on a horizontal shaft, $t$, the whole being arranged as represented. The said crank-wheel has a slot, $u$, made in it, to receive the crank-pin and to enable it to be adjusted with reference to the axis of the wheel, such pin being confined to the wheel by a screw and nut, as represented at $u'$ in Fig. 8, which is a vertical section of the wheel and the crank-pin.

An adjustable rest-frame, E, arranged as represented in Figs. 1, 3, and 4, and formed as exhibited in Figs. 9 and 10, one of which is a top view and the other a side elevation of it, turns vertically on the fulcrum-pin of the lifter D, and is provided with a curved slot, $w$, to receive a clamp-screw, $x$, by which and a nut applied to the screw it is fastened to the brace $h$. By the above-mentioned application of the frame E to the said fulcrum-pin and to the brace $h$ it is rendered capable of vertical adjustment as circumstances may require. The purpose of the adjustable rest-frame is to support the lower ends of the arms of the harness-carriers when at their lowest positions.

The upper part, $y$, of the rest-frame E is what I term the "stop-bar," its object being to prevent accidental elevation of either of the harness-carriers, which it does by extending over a series of catches or studs, $z$, one of which projects from each of the arms of the carriers.

When a ball or wheel of the pattern-chain is brought into action against any one of the lower arms of the shorter levers $b$ it will move such lever on its fulcrum so as to cause the fellow larger lever to be simultaneously moved on its fulcrum, in which case the arm $f$, passing through the connecting-rod $g$ of such longer lever, will be moved by such rod so as to advance its stud $h$ or cause it to extend directly over the lifter D, in order that such lifter, during its upward movement, may raise the arm and its carrier so as to effect the upward movement of the harness. The lifter D is raised by the action of the crank-pin $r$ of the wheel $s$, the slot $q$ being so formed as to maintain the lifter, after its elevation, at rest, for a period sufficient for the passage of the shuttle through the shade of the warps.

During the downward movement of the lifter D it will depress the carrier previously raised by it, after which the arm of such carrier is to be drawn back out of action with the lifter. This will be accomplished by a ball of the pattern-chain being made to act against the upper arm of the longer lever $a$ appertaining to the vibratory arm of such carrier, the action of the pattern-chain ball being such as to cause the necessary movement of the said lever $a$.

By having the curved part $l$ of the lifter adjustable vertically with reference to the rest of the lifter we can vary the degree of elevation of the carriers, and of course the opening of the shade of the warps, as circumstances may require. So by having the curved part $l$ adjustable with reference to the rest of the lifter, and by having the rest-frame E adjustable vertically, we can adjust the shade as occasion may require in order to prevent the warps from being chafed by the shuttle, or for other purposes.

It is to be understood that while the loom may be in operation the shaft $t$ is to be put in revolution, so as to cause the elevation and depression of the lifter at the proper times and with due reference to the action of the pattern-chain. The harnesses may be fixed in the carriers in any suitable manner and be held therein by any proper devices.

I claim in the above-described mechanism the following as my invention—that is to say:

1. The combination or mechanism, substantially as described, for operating the harness-carriers, the same consisting of two sets of levers, $a\ b$, the connecting-rods $g$, the vibratory arms $f$, and the lifter D and its rotary cranked wheel $s$, with its crank-pin $r$.

2. The combination of the rest-frame E, or its equivalent, with the mechanism or combination, substantially as described, for operating the harness-carriers.

3. The combination of the stop-bar $y$ and the series of studs or catches $z$ with the rest-frame E, the harness-carriers, and their operative mechanism, substantially as described.

4. The combination of the slot $u$ and adjustable crank-pin $r$ and the adjustable rest-frame E with the harness-carriers and the mechanism for operating them, substantially as described.

5. The application of the slotted curved arm $l$ to the remainder of the lifter D, so as to be adjustable with respect to the same, substantially as and for the purpose specified.

WM. W. McGREGOR.

Witnesses:
 R. H. EDDY,
 F. P. HALE, Jr.